J. A. Sinclair,
Pump.
No. 102,442.      Patented Apr. 26. 1870.
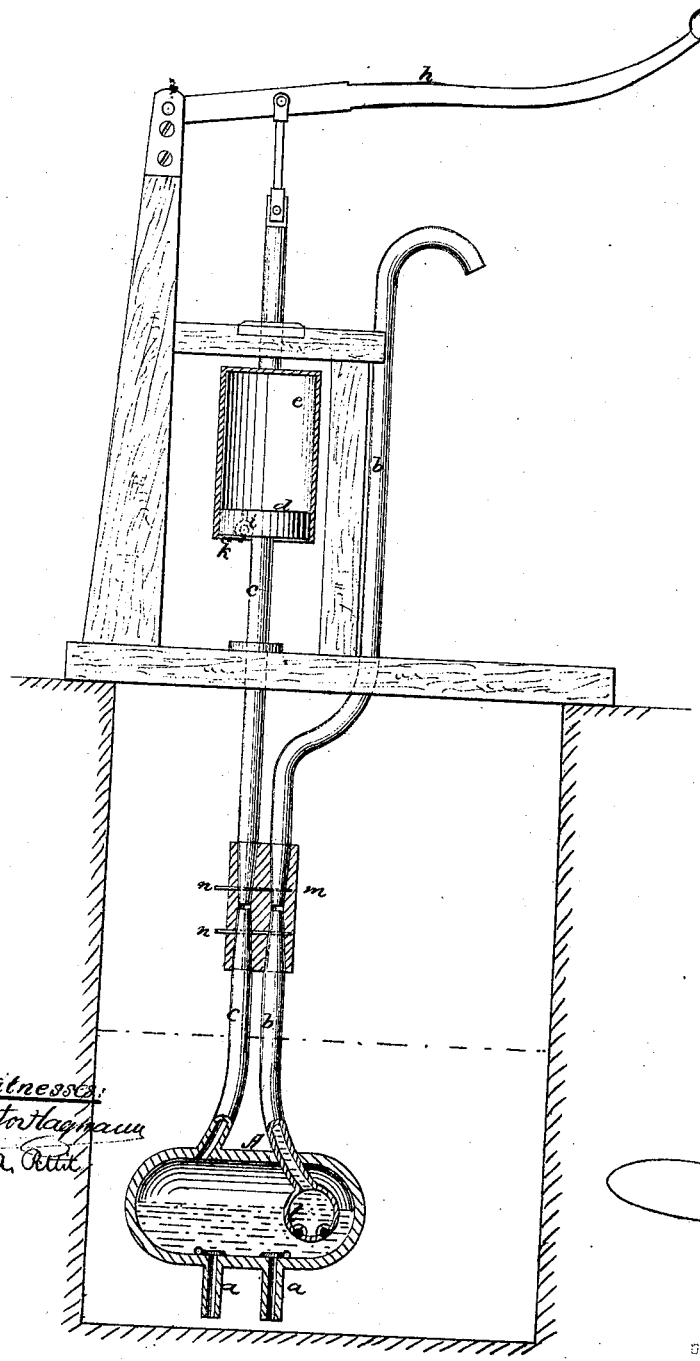

United States Patent Office.

JAMES A. SINCLAIR, OF WOODSFIELD, OHIO, ASSIGNOR TO HIMSELF, SAMUEL L. MOONEY, OF SAME PLACE, AND WILLIAM W. JORDAN, OF OTTAWA, KANSAS.

Letters Patent No. 102,442, dated April 26, 1870.

IMPROVEMENT IN PUMPS.

The Schedule referred to in these Letters Patent and making part of the same.

*To all whom it may concern:*

Be it known that I, JAMES A. SINCLAIR, of Woodsfield, in the county of Monroe and State of Ohio, have invented a new and useful Improvement in Pumps; and I do hereby declare that the following is a full, clear, and exact description of the same, reference being had to the accompanying drawings making a part of this specification, in which the figure is a sectional elevation.

This invention has for its object to drive water, confined in a chamber in a well, to the surface, by creating atmospheric pressure in the chamber above the water.

The invention consists in the combination of an air-chamber placed in the water in a well, and communicating therewith by means of pipes, with one pipe extending to the surface, for the escape of water, another pipe leading downward from the surface for the supply of air to the chamber, a stationary piston on the air-pipe, and a cylinder sliding over the piston, for the collection and compression of air.

In the drawing—

A is the chamber within the well, constructed of metal or other suitable material.

*a a*, the pipes by which water enters the chamber.

*b*, the pipe by which water rises from the chamber to the surface.

*c*, the pipe by which air is forced downward into the chamber A.

*d*, a stationary piston or disk on the upper end of the air-pipe *c*, with a central orifice, through which the air-pipe passes.

*e*, a cylinder fitted to the rim of the piston *d*, so as to slide up and down thereon under the action of the lever *h*, to which the cylinder-stem is jointed.

*i* is a globe-valve in the piston *d*, opening upward.

*k* is a slide over the lower mouth of the orifice in the piston, in which the valve *i* lies, by which slide the amount of air passing through the globe-valve is regulated.

On lowering the cylinder, the air between it and the piston is forced into the pipe *c*, and down into the chamber A. If one stroke of the cylinder does not create sufficient pressure in the chamber A to force water out of it, on raising the cylinder a fresh supply of air enters it through the valve *i*, and at the next down stroke more air is sent into the chamber.

The lower end of the air-pipe is to be furnished with a bulb or cylinder, *l*, within the main chamber, and provided with valves, for letting water into the cylinder under the atmospheric pressure outside it.

The chamber A should be placed so low in the well as to keep the valves of the inner cylinder always under water, else the compressed air will escape through them.

If either of the pipes *b c* is made in two pieces, the coupling may be effected by tapering the contiguous ends, and burying them in a block, *m*, and fastening them therein by keys *n* passing through the block, and occupying notches in the sides of the pipes. The pipes may, however, be made each of one piece.

The advantage of a cylinder sliding over a fixed piston is, that the latter is thereby protected from contact with all external matter.

Having thus described my invention,

What I claim as new, and desire to secure by Letters Patent, is—

The combination of the chamber A, inclosed bulb or cylinder *l*, pipes *b c*, stationary piston *d*, and movable cylinder *e*, all constructed and arranged to operate as set forth.

JAMES A. SINCLAIR.

Witnesses:
JNO. B. NOLL,
W. HOLLISTER.